(12) United States Patent
Koizumi et al.

(10) Patent No.: US 6,551,530 B2
(45) Date of Patent: Apr. 22, 2003

(54) METHOD OF FORMING A HYBRID LENS

(75) Inventors: Hiroshi Koizumi, Kanagawa (JP); Kazuhiro Tanaka, Tokyo (JP); Eiji Ohshima, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/837,223

(22) Filed: Apr. 19, 2001

(65) Prior Publication Data

US 2001/0033360 A1 Oct. 25, 2001

(30) Foreign Application Priority Data

Apr. 20, 2000 (JP) ........................................ 2000-119686

(51) Int. Cl.⁷ .............................................. B29D 11/00
(52) U.S. Cl. ........................ 264/1.36; 264/1.38; 264/1.7
(58) Field of Search ........................ 264/1.1, 1.7, 1.36, 264/1.38; 425/808

(56) References Cited

U.S. PATENT DOCUMENTS 3,971,841 A * 7/1976 Rubinstein .................. 425/808
4,623,496 A * 11/1986 Verhoeyen et al. .......... 264/1.7
5,219,497 A * 6/1993 Blum ......................... 264/1.38
6,165,392 A * 12/2000 Kobuchi et al. ............. 264/1.7

FOREIGN PATENT DOCUMENTS

| EP | 0156430 | | 2/1985 |
| JP | 8-142068 | * | 6/1996 |

OTHER PUBLICATIONS

Search and Examination Report dated Aug. 23, 2002, from Austrian Patent Office for Application No. 200102149–2.

* cited by examiner

Primary Examiner—Mathieu D. Vargot
(74) Attorney, Agent, or Firm—Rader, Fishman & Grauer, PLLC; Ronald P. Kananen, Esq.

(57) ABSTRACT

In a hybrid lens forming method for transferring an aspherical composite layer made of an ultraviolet-curing resin, which is curable by irradiation with ultraviolet rays, onto one surface of a convex lens by using a forming die, the forming die is made of a material which transmits ultraviolet rays, and the aspherical composite layer is transferred onto the convex lens by applying ultraviolet rays from the side of the forming die and curing the ultraviolet-curing resin with ultraviolet rays transmitted through the forming die.

5 Claims, 7 Drawing Sheets

METHOD OF FORMING A HYBRID LENS

BACKGROUND OF THE INVENTION

1. Field of the Invention

The present invention relates to a hybrid lens and a hybrid lens forming method in which an aspherical composite layer is made of an ultraviolet-curing resin. More particularly, the present invention relates to a hybrid lens forming method in which a forming die for forming an aspherical composite layer transmits ultraviolet rays, and a precise aspherical composite layer is formed, without any influence of the curved surface of the lens or the like, by applying ultraviolet rays to a resin from the side of the forming die and thereby curing the resin.

2. Description of the Related Art

Conventionally, so-called hybrid lenses, in which an aspherical composite layer is formed on a single lens of optical glass serving as a parent material, are commercially practical as a means for forming an aspherical lens at relatively low cost. The hybrid lenses are produced by transferring an aspherical composite layer made of an ultraviolet-curing resin to the lens surface of a single lens made of optical glass.

FIG. 13 shows a conventional hybrid lens forming method. In this method, after a predetermined amount of ultraviolet-curing resin 32 is poured on a mirror-finished transfer face 31 of a die 30 for forming an aspherical composite layer, a convex lens 33 is placed in the die 30 and fixed thereto by using a support frame 34. The ultraviolet-curing resin 32 thereby fills the entirety of the transfer face 31. When ultraviolet rays UV are applied from the side of the convex lens 33 for a predetermined time in this state, the ultraviolet-curing resin 32 is cured with the ultraviolet rays transmitted through the convex lens 33, and a hybrid lens is formed with an aspherical composite layer transferred to the convex lens 33.

The above-described method allows a precise hybrid lens to be produced at a relatively low cost because the die 30 is excellent in workability and durability. However, since the convex lens 33 sometimes does not transmit ultraviolet rays well depending on the type of the optical glass, an excessively long time is needed to cure the ultraviolet resin 32 and productivity is thereby reduced. For this reason, the types of available optical glasses are limited, and this decreases the degree of freedom in design.

Since the ultraviolet-curing resin 32 is cured with the ultraviolet rays UV which are applied from the side of the convex lens 33 and are transmitted therethrough, the ultraviolet rays UV are prone to be influenced by the lens curvature. For example, since the convex lens 33 has a light collecting function, the applied ultraviolet rays UV concentrate in the center of the convex lens 33, as shown in FIG. 13, and the intensity distribution thereof is nonuniform. For this reason, the ultraviolet-curing resin 32 is not cured uniformly, and it is difficult to produce a precise hybrid lens.

SUMMARY OF THE INVENTION

The present invention has been made in order to overcome the above problems, and an object of the invention is to provide a hybrid lens and a hybrid lens forming method in which a precise hybrid lens can be produced by effectively and uniformly curing an ultraviolet-curing resin without being affected by the type of optical glass and the curvature.

In order to achieve the above object, according to an aspect of the present invention, there is provided a hybrid lens forming method in which a forming die is made of a material which transmits light rays, and a composite layer is transferred onto a lens by applying light rays from the side of the forming die and curing a photocurable resin with the light rays transmitted through the forming die.

According to the above-described hybrid lens forming method, since the photocurable resin can be cured with the light rays applied from the side of the forming die, the light rays are not affected by the lens curvature, and the photocurable resin can be irradiated with a uniform intensity distribution. This makes it possible to produce a precise hybrid lens without causing nonuniform curing of the photocurable resin.

According to another aspect of the present invention, there is provided a hybrid lens in which a lens frame is formed integrally with a composite layer. In this case, it is possible to omit the subsequent step of assembling the lens frame to the hybrid lens, to reduce the number of components, and to reduce the cost of the hybrid lens.

Further objects, features, and advantages of the present invention will become apparent from the following description of the preferred embodiments with reference to the attached drawings.

DESCRIPTION OF THE PREFERRED EMBODIMENTS

Preferred embodiments of a hybrid lens and a forming method therefor according to the present invention will be described below with reference to the attached drawings.

Figure 1:
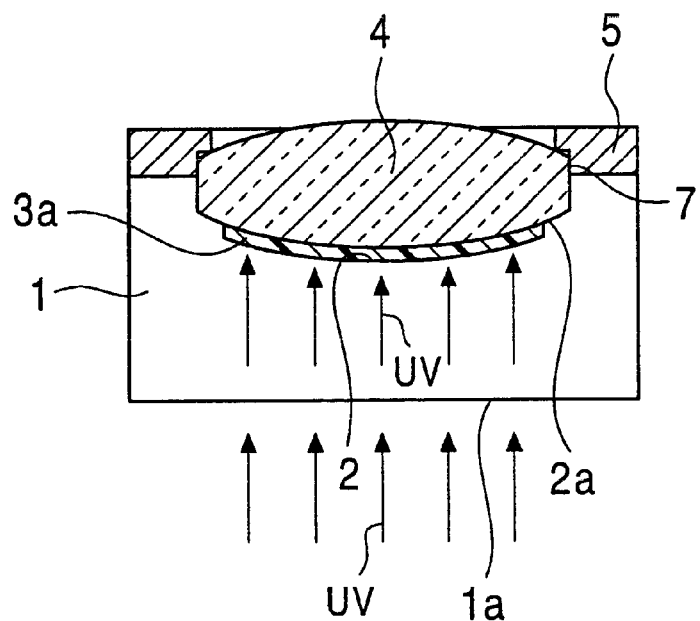
FIG. 1 is an explanatory view showing a hybrid lens forming method utilizing a convex lens.

FIG. 1 shows a hybrid lens forming method for transferring an aspherical composite layer to one surface of a convex lens made of optical glass by using a forming die. A forming die 1 is made of a material, such as BK7 or BSC7, which transmits ultraviolet rays with wavelengths ranging, for example, from 200 nm to 400 nm. The lower surface of the forming die 1 is made flat so as to serve as an incident surface 1a for ultraviolet rays.

The forming die 1 has a smoothened concave transfer face 2 for forming an aspherical composite layer thereon. On the outer periphery of the transfer face 2, an annular receiving face 2a is formed so as to place thereon a convex lens which will be described later. After a predetermined amount of ultraviolet-curing resin 3a, which is the material of the aspherical composite layer, is poured on the transfer face 2, a convex lens 4 made of optical glass is placed on the forming die 1 and is fixed thereto by using a support frame 5 and a fixing means (not shown). The ultraviolet-curing resin 3a thereby fills the entire space between the transfer face 2 and the convex lens 4. Part of the ultraviolet curing resin 3a, which has overflowed from the transfer face 2, flows through a joint face between the receiving face 2a and the convex lens 4 and is discharged outside from a gap 7 between the convex lens 4 and the support frame 5. The ultraviolet-curing resin 3a is, for example, an acrylic or epoxy transparent resin that is curable with ultraviolet rays having the wavelengths ranging from 200 nm to 400 nm.

Figure 2:
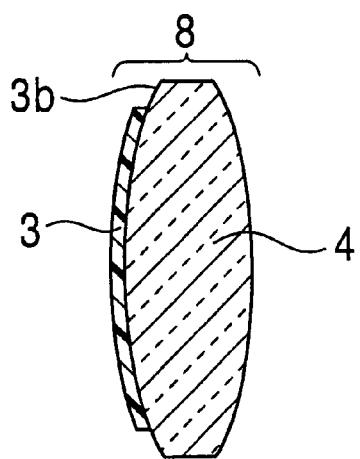
FIG. 2 is a cross-sectional view of a hybrid lens taken out of a forming die shown in FIG. 1.

When ultraviolet rays UV are applied from the side of the incident surface 1a of the forming die 1 in such a state in which the convex lens 4 is placed on the forming die 1, they enter the forming die 1 in parallel from the incident surface 1a. The ultraviolet-curing resin 3a is thereby irradiated and cured with a uniform intensity. Through the above procedure, a hybrid lens 8 shown in FIG. 2 is formed in which an aspherical composite layer 3 is transferred while a portion 3b has no aspherical composite layer on the outer periphery of the convex lens 4. The portion 3b having no aspherical composite layer allows the hybrid lens 8 to be used to caulk or abut a lens holder.

Figure 3:
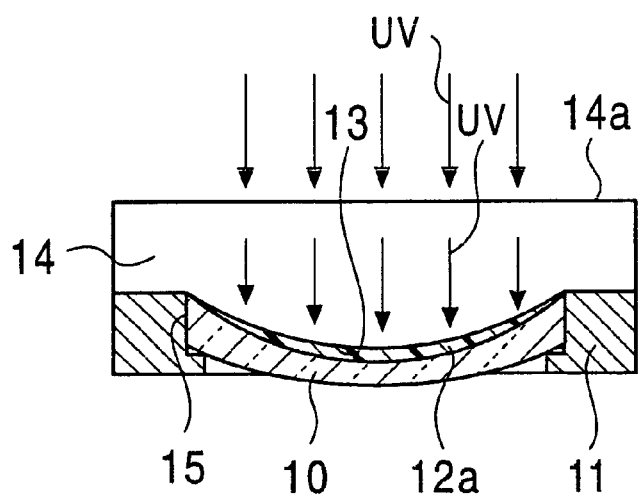
FIG. 3 is an explanatory view showing a hybrid lens forming method utilizing a concave lens.

FIG. 3 shows a hybrid lens forming method for transferring an aspherical composite layer to one surface of a concave lens made of optical glass by using a forming die. In this case, a concave lens 10 is first placed in a support frame 11, and a predetermined amount of ultraviolet-curing resin 12a is poured on the concave lens 10. Then, a forming die 14 having a convex transfer face 13 is placed on the concave lens 10 from above and is fixed thereto by using the support frame 11 and a fixing means (not shown).

The forming die 14 is made of a material, such as BK7 or BSC7, which transmits ultraviolet rays with the wavelengths ranging from 200 nm to 400 nm, in a manner similar to that in the above-described forming die 1. The upper surface of the forming die 14 is made flat so as to serve as an incident surface 14a for ultraviolet rays. The ultraviolet-curing resin 12a is, for example, an acrylic or epoxy transparent resin that is curable with ultraviolet rays having the wavelengths ranging from 200 nm to 400 nm.

By placing the forming die 14 on the concave lens 10, the ultraviolet-curing resin 12a fills the entire space between the concave lens 10 and the transfer face 13. Part of the ultraviolet-curing resin 12a, which has overflowed from the transfer face 13, is discharged outside through a joint face 15 between the concave lens 10 and the support frame 11.

Figure 4:
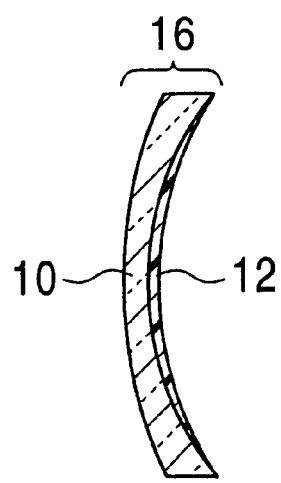
FIG. 4 is a cross-sectional view of a hybrid lens taken out of a forming die shown in FIG. 3.

When ultraviolet rays UV are applied from the side of the incident surface 14a of the forming die 14 in such a state, they enter the forming die 14 in parallel through the incident surface 14a. The ultraviolet-curing resin 12a is thereby irradiated and cured with a uniform intensity. Through the above procedure, a hybrid lens 16 shown in FIG. 4 is formed in which an aspherical composite layer 12 is transferred to the lens surface of the concave lens 10.

Figure 5:
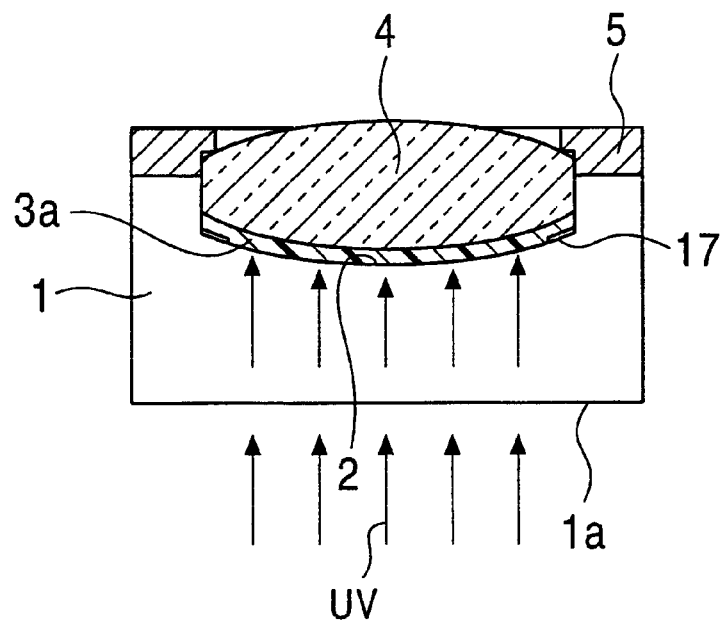
FIG. 5 is an explanatory view showing a method for forming a hybrid lens having a convex lens in which a portion having no composite layer is formed by using a light-shielding layer.

FIG. 5 shows a hybrid lens forming method according to a modification of the forming method shown in FIG. 1, in which the outer periphery of a transfer face 2 of a forming die 1 is coated with a light-shielding layer 17 made of aluminum foil or the like so that a portion having no aspherical composite layer is formed on the outer periphery of a convex lens 4. In the following description, the same components as in FIG. 1 are denoted by the same reference numerals.

Figure 6:
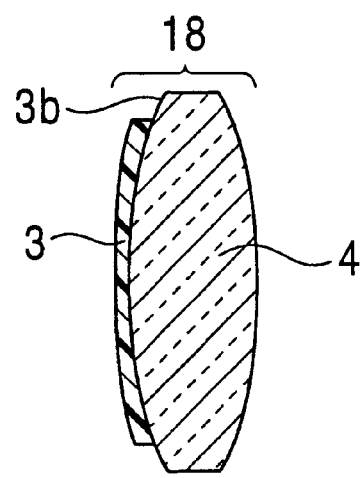
FIG. 6 is a cross-sectional view of a hybrid lens taken out of a forming die shown in FIG. 5.

When ultraviolet rays UV are applied from the side of an incident surface 1a of the forming die 1, they enter the forming die 1 in parallel from the incident surface 1a, and irradiate ultraviolet-curing resin 3a. In this case, one part of the ultraviolet-curing resin 3a at a portion where the light-shielding layer 17 is not formed is cured to form a composite layer, whereas the other part at a portion where the light-shielding layer 17 is formed is not irradiated with ultraviolet rays UV and is not cured. Therefore, by taking the convex lens 4 out of the forming die 1 and then removing the uncured part of the ultraviolet-curing resin 3a by, for example, wiping or washing, a hybrid lens 18 shown in FIG. 6 is formed in which an aspherical composite layer 3 is transferred, while a portion 3b has no composite layer 3 on the outer periphery of the convex lens 4. The portion 3b having no composite layer allows the hybrid lens 18 to be caulked to or abutted against a lens holder, and this increases assembly accuracy.

While it is more preferable that the light-shielding strength of the light-shielding layer 17 be high, the uncured part of the ultraviolet-curing resin 3a can be easily removed from the convex lens 4 by wiping or washing as long as the degree of curing of the uncured part is 5% or less. For this reason, the light-shielding strength of the light-shielding layer 17 can be determined based on the degree of curing of the uncured part. For example, when the degree of curing of the ultraviolet-curing resin 3a irradiated with the ultraviolet rays reaches approximately 50%, it is satisfactory as long as the light-shielding strength of the light-shielding layer 17 is $\frac{1}{10}$ or less.

Figure 7:
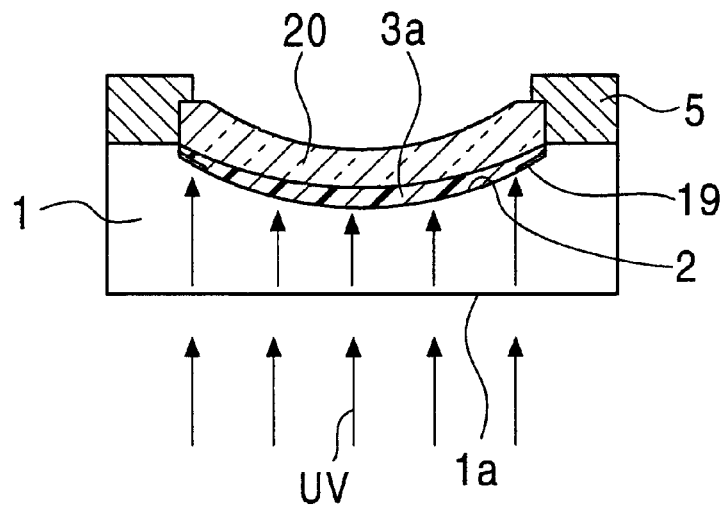
FIG. 7 is an explanatory view showing a method for forming a hybrid lens having a concave lens in which a portion having no composite layer is formed by using a light-shielding layer.

FIG. 7 shows a hybrid lens forming method in which the outer peripheral portion of a transfer face 2 of a forming die 1 is coated with a light-shielding layer 19 made of aluminum foil or the like so that an aspherical composite layer is not formed on a part of the surface of a concave lens 20. In the following description, the same components as in FIG. 5 are denoted by the same reference numerals.

Figure 8:
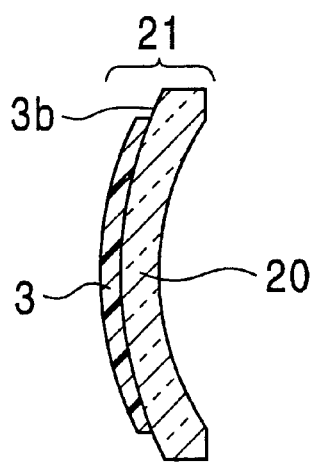
FIG. 8 is a cross-sectional view of a hybrid lens taken out a forming die shown in FIG. 7.

In this case, when ultraviolet rays UV are applied from the side of an incident surface 1a of the forming die 1, one part of ultraviolet-curing resin 3a at a portion where the light-shielding layer 19 is not formed is cured to form a composite layer. The other part of the ultraviolet-curing resin 3a at the light-shielding layer 19 is not irradiated with the ultraviolet rays UV and is not cured. The uncured part of the ultraviolet-curing resin 3a is removed by wiping or washing. Through the above procedure, a hybrid lens 21 shown in FIG. 8 is formed in which an aspherical composite layer 3 is transferred while a portion 3b has no composite layer on the outer periphery of the concave lens 20.

Figure 9:
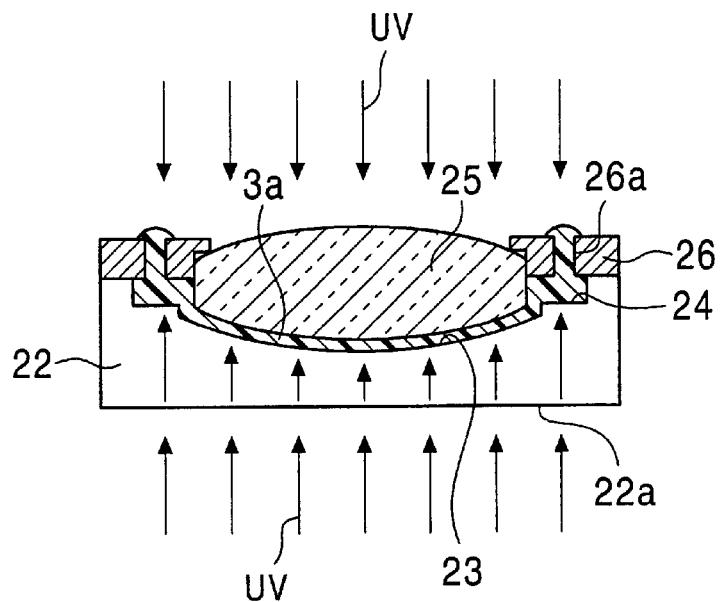
FIG. 9 is an explanatory view showing a method for forming a hybrid lens in which a lens holder is combined with a composite layer.

FIG. 9 shows a hybrid lens forming method in which an aspherical composite layer and a lens frame are simultaneously formed together. A forming die 22 used in this method transmits ultraviolet rays in a manner similar to the above, and the lower surface thereof is made flat so as to serve as an incident surface 22a for ultraviolet rays.

The forming die 22 includes a concave transfer face 23 for forming an aspherical composite layer, and a lens-frame forming die 24 connected to the outer periphery of the transfer face 23. A predetermined amount of ultraviolet-curing resin 3a is poured on the transfer face 23. Subsequently, a lens frame 26, which has through holes 26a, is made of a resin material, and is combined with a convex lens 25, is pressed and placed on the forming die 22, and is fixed thereto by fixing means (not shown). The ultraviolet-curing resin 3a thereby fills the entire space between the transfer face 23 and the convex lens 25, flows into the lens-frame forming die 24, and overflows from the through holes 26a of the lens frame 26 to be in the shape of a dome.

Figure 10:
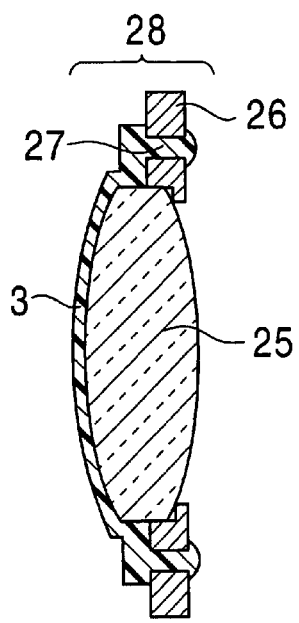
FIG. 10 is a cross-sectional view of a hybrid lens taken out a forming die shown in FIG. 9.

By then applying ultraviolet rays UV from both sides of the forming die 22 and the convex lens 25, the ultraviolet-curing resin 3a is cured. As a result, a hybrid lens 28 shown in FIG. 10 is formed in which an aspherical composite layer 3 is transferred to the convex lens 25 and the lens frame 26 is formed integrally therewith by a cured resin 27 protruding from the aspherical composite layer 3. Since the hybrid lens 28 thus formed can be assembled in a lens barrel by using the lens frame 26, it is possible to omit the step of assembling the lens holder onto the hybrid lens, as before, and to reduce the cost.

Figure 11A:
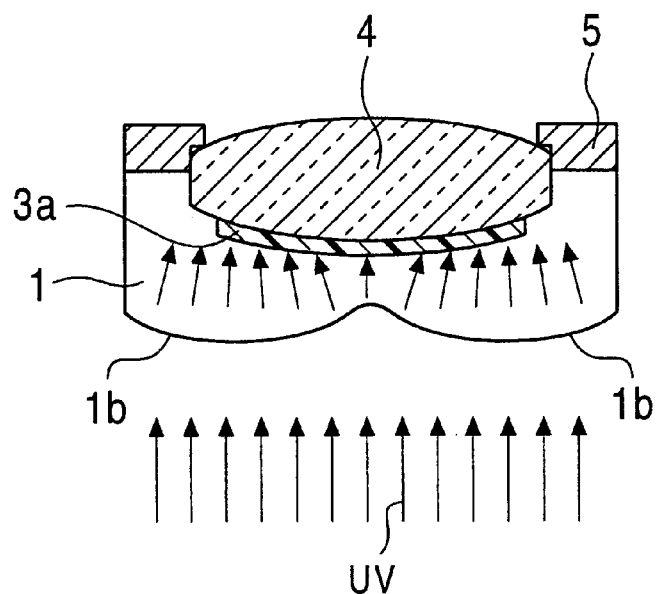
FIG. 11A is an explanatory view showing a hybrid lens forming method in which the incident surface of ultraviolet-curing resin is made nonplanar so that the ultraviolet ray intensity has a nonuniform distribution.
Figure 11B:
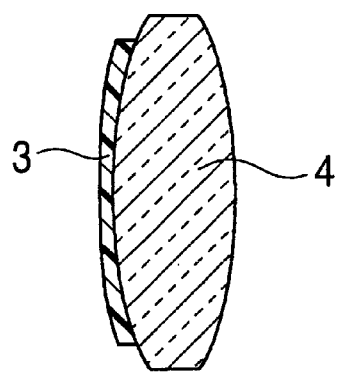
FIG. 11B is a cross-sectional view of a hybrid lens taken out of a forming die shown in FIG. 11A.
Figure 12:
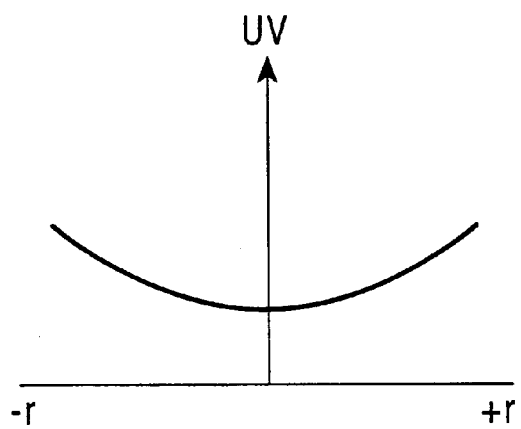
FIG. 12 is a graph showing the distribution of ultraviolet ray intensity.
Figure 13:
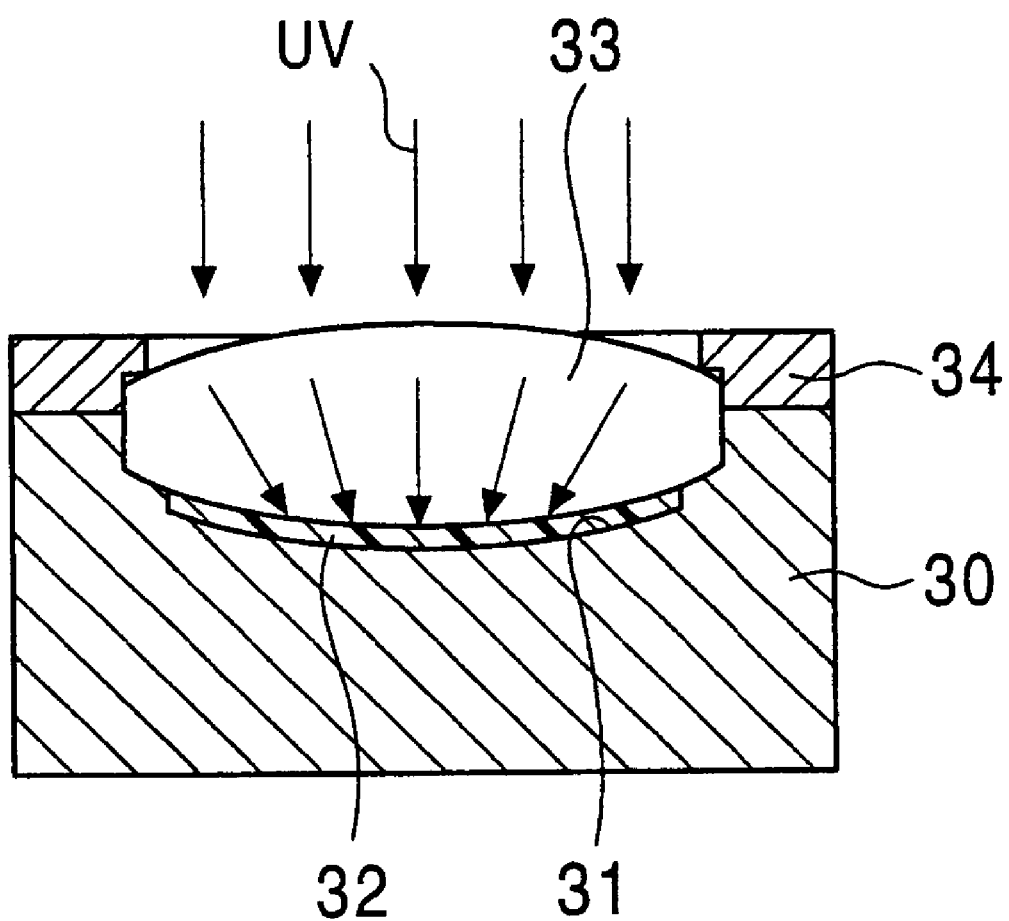
FIG. 13 is an explanatory view showing a conventional hybrid lens forming method.

FIGS. 11A and 11B show a hybrid lens forming method according to a modification of the method shown in FIG. 1, in which a forming die 1 has a curved incident surface 1b so that the illuminance distribution of ultraviolet rays can be varied depending on the thickness of an ultraviolet-curing resin 3a. In this case, the thickness of the ultraviolet-curing resin 3a on a transfer face 2 of the forming die 1 increases from the center toward the outer periphery. Therefore, the incident surface 1b is shaped like a convex lens so that the illuminance of the ultraviolet rays is low at the center and is high on the outer periphery, as shown in FIG. 12.

By doing this, ultraviolet rays UV incident from the incident surface 1b can uniformly cure the entirety of the ultraviolet-curing resin 3a. This makes it possible to form a hybrid lens in which a precise aspherical composite layer 3 is transferred, as shown in FIG. 11B.

It is more effective to coat the incident surfaces of the above-described forming dies 1 with an antireflection film which has the highest transmittance for ultraviolet rays with the wavelengths ranging from 200 nm to 400 nm. A monolayer type antireflection film is made of, for example, magnesium fluoride ($MgF_2$) having a refractive index of approximately 1.38. In order for the transmittance to be highest for a wavelength of approximately 300 nm, the thickness of the film is set to be approximately 54 nm.

A double layer type antireflection film is made of a combination of, for example, hafnium oxide ($HfO_2$) and magnesium fluoride ($MgF_2$), titanium oxide ($TiO_2$) and magnesium fluoride ($MgF_2$), tantalum pentoxide ($Ta_2O_5$) and magnesium fluoride ($MgF_2$), or zirconium oxide ($ZrO_2$) and magnesium fluoride ($MgF_2$). In these combinations, magnesium fluoride ($MgF_2$) may be replaced with silicon oxide ($SiO_2$).

By forming the antireflection film on the incident surface, as described above, it is possible to improve the intensity of ultraviolet rays reaching the ultraviolet-curing resin, compared with a case in which no antireflection film is formed, to reduce the curing time, and to improve productivity of the hybrid lens.

Since the aspherical composite layer is made of the synthetic resin that is curable with ultraviolet rays, commercially available resin materials and ultraviolet lamps can be used. This allows the hybrid lens to be produced at low cost.

As described above, in the hybrid lens forming method of the present invention, the forming die is made of a material that transmits light rays, light rays are applied from the side of the forming die, and the photocurable resin is cured with the light rays transmitted through the forming die, thereby transferring the composite layer to the lens. Therefore, the light rays are not affected by the lens curvature and the photocurable resin can be irradiated with a uniform intensity. This makes it possible to produce a precise hybrid lens in which the photocurable resin is cured uniformly.

Since the forming die is made of a material which transmits ultraviolet rays having at least the wavelengths ranging from 200 nm to 400 nm, it is possible to make the forming die of a commercially available and inexpensive material at low cost.

By forming the light-shielding layer on a part of the forming die, a portion having no composite layer can be formed easily. This increases the accuracy in assembling the lens holder onto the hybrid lens.

Since the antireflection film is formed on the light incident surface of the forming die so that the transmittance thereof is highest for the light rays with the wavelengths ranging from 200 nm to 400 nm, it is possible to reduce the curing time of the photocurable resin and to improve the productivity of forming the hybrid lens.

Since the light incident surface of the forming die is made nonplanar so that the light rays applied onto the photocurable resin have a nonuniform intensity distribution, even when the thickness of the photocurable resin is not even, it is possible to form a precise composite layer without causing nonuniform curing.

Since the lens frame is formed together with the composite layer, it is possible to omit the step of assembling the lens frame on the hybrid lens and to produce a hybrid lens having a lens frame at low cost.

Since the composite layer is aspherical, it is possible to reduce the aberrations of the hybrid lens and to improve the aberration correction ability when the hybrid lens is assembled into a unit.

Furthermore, since the composite layer is made of the ultraviolet-curing resin that is curable with ultraviolet rays having the wavelengths ranging from 200 nm to 400 nm, commercially available materials and ultraviolet lamps can be used. This makes it possible to produce the hybrid lens at low cost.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A hybrid lens forming method comprising the steps of:
   setting a single lens on a forming die which is made of a material which transmits light rays;
   transferring a photocurable resin between said forming die and a surface of said single lens to form a composite layer; and applying light rays to said photocurable resin through said forming die for curing said photocurable resin, wherein a light-shielding film is formed in a part of said forming die so that a portion having no composite layer is formed on said surface of said single lens;

wherein an antireflection film is formed on a light incident surface of said forming die.

2. A hybrid lens forming method comprising the steps of:

setting a single lens on a forming die which is made of a material which transmits light rays;

transferring a photocurable resin between said forming die and a surface of said single lens to form a composite layer; and applying light rays to said photocurable resin through said forming die for curing said photocurable resin, wherein a light-shielding film is formed in a part of said forming die so that a portion having no composite layer is formed on said surface of said single lens;

wherein the photocurable resin has an uneven thickness and the light incident surface of said forming die is made nonplanar so that the light rays applied onto said photocurable resin have a nonuniform intensity distribution to cure said composite layer uniformly.

3. The hybrid lens forming method according to claim 2, wherein said composite layer is aspherical.

4. The hybrid lens forming method according to claim 2, wherein said photocurable resin is made of an ultraviolet curing resin which is curable with ultraviolet rays.

5. A hybrid lens forming method comprising the steps of:

setting a single lens on a forming die which is made of a material which transmits light rays;

transferring a photocurable resin between said forming die and a surface of said single lens to form a composite layer; and applying light rays to said photocurable resin through said forming die for curing said photocurable resin, wherein a light-shielding film is formed in a part of said forming die so that a portion having no composite layer is formed on said surface of said single lens;

wherein a lens frame is formed integrally with said composite layer.

* * * * *